May 28, 1963  E. ZUMBRUNNEN  3,091,030
METHOD OF MAKING TRANSMISSION BELTS
Filed Sept. 15, 1959

Erhard ZUMBRUNNEN
*INVENTOR.*

*Mestern, Ross & Mestern*

United States Patent Office 3,091,030
Patented May 28, 1963

3,091,030
METHOD OF MAKING TRANSMISSION BELTS
Erhard Zumbrunnen, Magliaso, Lugano, Switzerland, assignor to Viso S.A., Magliaso, Lugano, Switzerland
Filed Sept. 15, 1959, Ser. No. 840,040
Claims priority, application Switzerland Sept. 18, 1958
3 Claims. (Cl. 29—527)

Transmission belts having enlargements at regular intervals to engage matching depressions in co-operating sheaves have the advantage of permitting practically perfect slip-free transmission.

Such belts may be produced in accordance with Swiss Patent No. 339,373 by passing a continuously stranded round belt of natural or synthetic fiber through a two-part injection mold and reinforcing it at periodic intervals by injection application of synthetic material to form beads. It is also known to cast metal beads on belts formed from stranded wires and to use one of these beads as a joint for uniting the two belt ends.

It is an object of the present invention to provide an improved transmission belt combining the advantages of light weight and high flexibility inherent in fibrous cords with the greater strength of metallic beads serving as gripping and joint-forming means.

A related object is to provide a process for securely attaching metallic beads to fibrous cords, without damage to the latter, for making a transmission belt of this type.

I have found, in accordance with this invention, that the foregoing objects may be realized by injection-molding a metallic bead on an elongated element made from natural or synthetic fibers and subsequently cold-pressing such bead around the element to insure firm interengagement between the metal and the fibrous material. The bead, for this purpose, is initially cast somewhat oversize so as to assume its proper dimensions upon compression.

The invention will now be more fully described with reference to the accompanying drawing.

Figure 1:
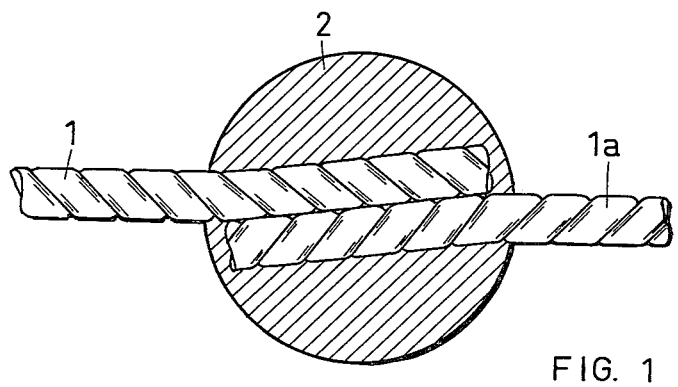
FIG. 1 is a sectional view of a bead according to the invention forming a joint between belt ends.

In FIG. 1 the two ends 1, 1a of a round belt consisting of fibrous material are imbedded by injection molding in a metal ball 2 finished to size by pressing.

Figure 2:
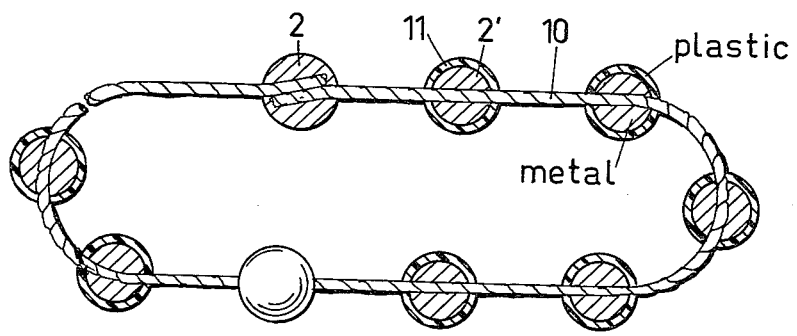
FIG. 2 is a perspective view of an entire belt carrying a series of beads of the general type shown in FIG. 1.

FIG. 2 shows the entire belt 10, whose ends 1, 1a are interconnected by the joint 2 of FIG. 1, provided at equispaced locations with enlargements in the form of similar metal beads 2' each coated with an outer layer 11 of synthetic material. When applying the metal balls 2, 2' by injection-molding to a belt element 10 of synthetic or natural fibrous material, it is advisable to take certain precautions. Thus it is advantageous if a belt element made of synthetic or natural fiber cord contains some moisture prior to such application. It is sufficient if the cord is kept for some time in moist air before having the metal balls molded therearound. If, instead of cords, filaments of synthetic material are used as the belt element, then it will not be possible to introduce enough moisture into the filament by exposure to air so that (when the metal is being applied, evaporation of water will form a protective layer of steam between filament and molten metal, preventing destruction of the filament. In that case, one may proceed by using a metal alloy whose melting point is at least 10°–20° C. below the melting point of the synthetic. An alternative measure is to make provision for rapid removal of heat, by chilling the filament, the injection mold or both, just before the casting operation.

Suitable belt materials include virtually any material that can be worked into cord or filaments and that possesses the necessary tensile strength for transmission belt applications, as for example leather, jute, hemp, ramie, polyamide and polyterephthalate filaments or cords.

The deposition of the coating 11 on the beads 2' proceeds in a second injection operation with abrasion-resistant synthetic, the final shaping of the enlargement, for example into spheres or ellipsoids, being advantageously effected by injection application of the thermoplastic synthetic coating. The result is a transmission belt which, while retaining the advantageous properties of a cord with metal balls serving as grippers, will not give rise in operation to excessive centrifugal forces such as could develop with fully metallic balls.

Figure 3:
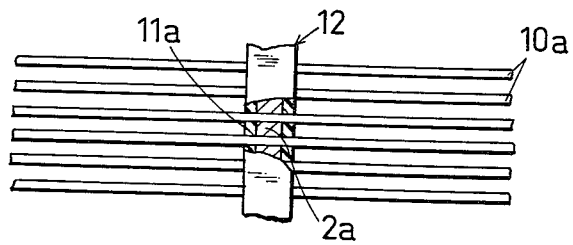
FIG. 3 shows in plan view a portion of a different belt whose constituent parallel elements are interconnected by modified enlargements according to the invention.

Another modification of a transmission belt according to the invention, shown in FIG. 3, consists of a plurality of single round strands 10a extending parallel to and bridged by common reinforcements 12 in the form of metallic cross-members 2a with plastic coverings 11a applied at regular intervals, likewise by injection molding. Such belts may for example be produced by interconnecting the parallel strands 10a by the composite cross-members 12 by injection molding in an apparatus as described in Swiss Patent No. 339,373, and then joining the ends with a similar but wholly metallic cross-member as shown in FIG. 2 with reference to joint 2. The resulting transmission element will resemble a flat belt, yet will afford absolute slip-proofness when running on pulleys which must in this case have depressions comprising transverse grooves to be engaged by the cross-members 12 of the belt.

A preferred material for use in the enlargements 2, 2' or 2a is bearing metal, or an alloy consisting of tin, copper, antimony and lead. By varying the composition, the melting point can be adjusted as desired.

*Example.*—A transmission belt of ramie or polyethylene terephthalate consisting of a twine with approximately 1800 individual fibrils with a total weight of 250 deniers is sheathed in a braided yarn consisting of polycaprolactam filaments. By injection molding, at a spacing of approximately 1 cm., metal balls of an alloy of 80% tin, 12% antimony, 6% copper and 2% lead by weight are applied. The balls are 3.2 mm. in diameter, and are subsequently compressed cold to 3 mm. diameter. The injection temperature is 200° C. In like manner, the ends of the belt are joined by injection application of a metal ball. The result is a belt with metal balls seated absolutely tight.

What I claim is:

1. A method of making an endless transmission belt, comprising the steps of injection-molding around an elongated fibrous element in chilled condition a plurality of metallic beads at spaced locations, thereby forming several intermediate enlargements and a link joining the ends of said element together, and cold-pressing all of said beads on said element to a predetermined size.

2. A method of making an endless transmission belt, comprising the steps of injection-molding around a moistened fibrous cord a plurality of metallic beads at spaced locations, thereby forming several intermediate enlargements and a link joining the ends of said cord together, and cold-pressing all of said beads to a predetermined size.

3. A method of making an endless transmission belt, comprising the steps of injection-molding around an elongated element a plurality of metallic beads at spaced locations, thereby forming several intermediate enlargements and a link joining the ends of said element together, cold-pressing all of said beads on said element to a predetermined size for causing their adherence to said element, and individually coating each of said intermediate enlargements with a plastic layer.

References Cited in the file of this patent

UNITED STATES PATENTS

| | | |
|---|---|---|
| 332,672 | Mellette et al. | Dec. 15, 1885 |
| 516,568 | Garland | Mar. 13, 1894 |
| 625,340 | Legg | May 23, 1899 |
| 967,950 | Molyneux | Aug. 23, 1910 |
| 2,209,673 | Bratz | July 30, 1940 |
| 2,263,340 | Kraemer | Nov. 18, 1941 |
| 2,298,591 | Ross | Oct. 13, 1942 |
| 2,865,214 | Runton | Dec. 23, 1958 |
| 2,874,583 | Platt | Feb. 24, 1959 |

FOREIGN PATENTS

| | | |
|---|---|---|
| 1,108,374 | France | Aug. 31, 1955 |